(12) United States Patent
Frankl

(10) Patent No.: US 7,946,041 B2
(45) Date of Patent: May 24, 2011

(54) T-BACK HAND SAW

(76) Inventor: Joseph Frankl, Bethlehem, PA (US)

( * ) Notice: Subject to any disclaimer, the term of this patent is extended or adjusted under 35 U.S.C. 154(b) by 442 days.

(21) Appl. No.: 12/229,409

(22) Filed: Aug. 22, 2008

(65) Prior Publication Data
US 2009/0049700 A1  Feb. 26, 2009

(51) Int. Cl.
B23D 51/01 (2006.01)
B26B 9/00 (2006.01)
(52) U.S. Cl. .................. 30/517; 30/353; 30/348; 83/835
(58) Field of Classification Search ............ 30/506–525, 30/348, 353, 165, 166.3; 83/881, 835, 846, 83/875, 879; 407/29.15
See application file for complete search history.

(56) References Cited

U.S. PATENT DOCUMENTS

| | | | |
|---|---|---|---|
| 66,174 A * | 6/1867 | Roe | 30/166.3 |
| 278,857 A * | 6/1883 | Berwick | 112/226 |
| 458,292 A * | 8/1891 | Kerr | 30/524 |
| 563,521 A * | 7/1896 | Walter | 30/166.3 |
| 604,850 A * | 5/1898 | Wright | 30/165 |
| 609,967 A * | 8/1898 | Ladd | 30/517 |
| 854,355 A * | 5/1907 | Holtz | 144/251.2 |
| 1,663,076 A * | 3/1928 | Garner | 30/506 |
| 1,716,941 A * | 6/1929 | Zinggeler | 30/517 |
| 2,137,800 A * | 11/1938 | Davey | 30/517 |
| 2,282,902 A | 5/1942 | Sulton | |
| 2,361,256 A * | 10/1944 | Barland | 30/517 |
| 2,432,866 A | 12/1947 | Dow | |
| 2,452,148 A * | 10/1948 | Rhodes | 30/517 |
| 2,604,130 A * | 7/1952 | Derby | 30/166.3 |
| 2,693,025 A * | 11/1954 | Driscoll | 29/597 |
| 2,773,528 A * | 12/1956 | Gringer | 30/519 |
| 2,778,395 A * | 1/1957 | Forsberg | 30/166.3 |
| 2,907,108 A * | 10/1959 | Nolte, Jr. | 30/353 |
| 2,975,505 A * | 3/1961 | Linskey et al. | 407/29.15 |
| 3,114,402 A | 12/1963 | Jacoff | |
| 3,338,278 A * | 8/1967 | Reuterfors | 30/166.3 |
| 3,470,923 A * | 10/1969 | Besthorne | 83/835 |
| 3,480,055 A * | 11/1969 | Lapointe | 30/517 |
| 4,248,284 A | 2/1981 | Tomosada | |
| 4,345,499 A * | 8/1982 | Ross | 83/835 |
| 4,630,368 A * | 12/1986 | Izzi, Sr. | 30/289 |
| 5,581,889 A * | 12/1996 | Reuter | 30/142 |
| 6,030,501 A * | 2/2000 | Neun et al. | 162/352 |
| 6,243,911 B1 * | 6/2001 | Varner | 15/245 |
| 6,382,117 B2 * | 5/2002 | Cardoso et al. | 112/222 |
| 6,416,276 B1 * | 7/2002 | Marmilic et al. | 415/178 |
| 6,578,268 B2 | 6/2003 | Hawketts | |
| 6,789,326 B1 * | 9/2004 | Huang | 30/517 |

(Continued)

Primary Examiner — Kenneth E. Peterson
Assistant Examiner — Sean Michalski
(74) Attorney, Agent, or Firm — Sanford J. Piltch

(57) ABSTRACT

A hand saw including an ergonomically constructed saw blade holder with a pistol type grip, an elongated support having a blade channel for receiving and supporting a particular "T" blade, and various tooth configurations of a saw blade having a cooperating T-shaped blade shanks. Each blade shank includes an aperture at its rear end for receiving a locking pin positioned at the back end of the blade holder that drops into position to secure the blade within the channel of the grip. Additionally, a trigger-like mechanism on the pistol grip, when squeezed, rotates a rubber surfaced pad upward through an opening in the base of the support to contact the underside of the blade shank pushing it upward into the top of the channel to insure blade stability. The "T" design of the blade allows orienting the cutting surface of the blades in different directions so that a user does not have to twist their body or arm to saw.

8 Claims, 4 Drawing Sheets

U.S. PATENT DOCUMENTS

| | | |
|---|---|---|
| 6,854,187 B2 | 2/2005 | Huan |
| 7,134,163 B2* | 11/2006 | Varner ............... 15/245 |
| 7,325,314 B1* | 2/2008 | Chen ................ 30/337 |
| 7,363,678 B2* | 4/2008 | Varner ............... 15/245 |
| 7,617,608 B2* | 11/2009 | Zakarian ............ 30/514 |
| 2007/0101590 A1* | 5/2007 | Ping ................. 30/517 |
| 2008/0276470 A1* | 11/2008 | Ritter et al. ......... 30/392 |
| 2010/0263219 A1* | 10/2010 | Kempker et al. ...... 30/337 |

* cited by examiner

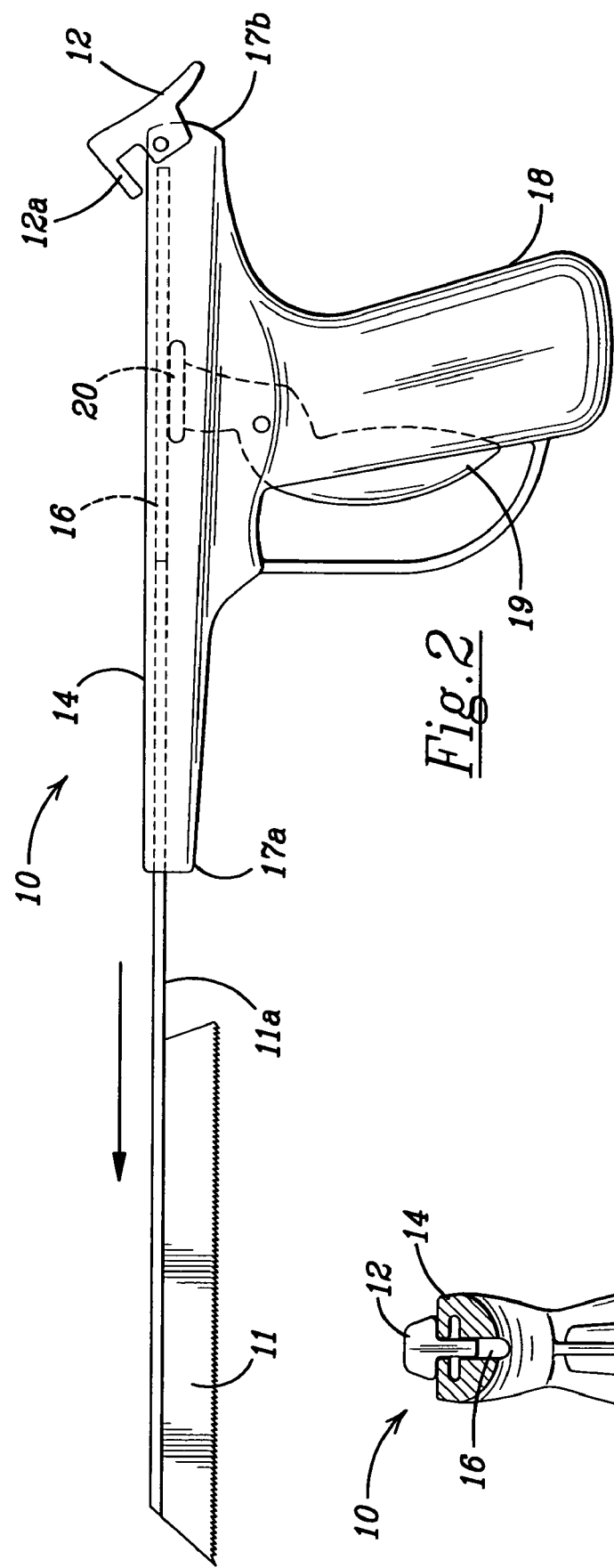

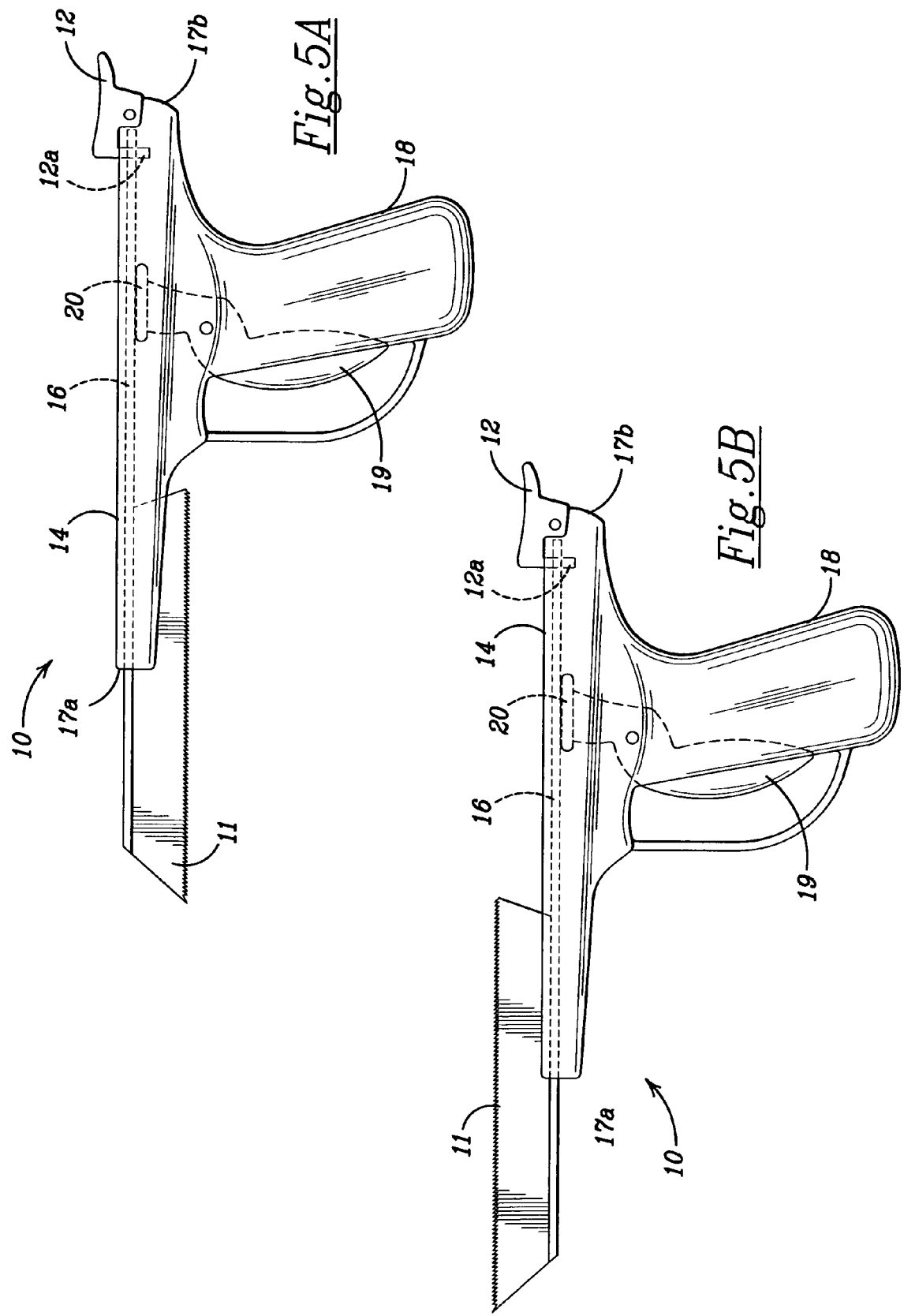

T-BACK HAND SAW

BACKGROUND OF THE INVENTION

The present invention relates generally to hand saws with replaceable cutting blades and, more particularly, to a hand saw consisting of an ergonomically constructed saw blade holder with a pistol type support grip, and variations of a saw blade having a T-shaped structure for securing the blade within the grip. The support grip is designed and constructed with an elongated support having an elongated channel for receiving and supporting a particular "T" blade. Each blade configuration includes an aperture at its back end for receipt of a locking pin positioned at the back end of the support grip that engages the aperture to secure the blade in the support grip. Additionally, a trigger-like squeeze mechanism on the pistol grip rotates a rubber surfaced pad upward to contact the blade within the support grip and further secure the blade in the channel. The "T" design of the blade and support shank permits the rotation of the blades in 90° segments in order that the blade teeth can be faced in different directions that insure that a user does not have to twist their body or arm to saw. Many standard tooth styles can be utilized, i.e. hacksaw, rasp, wallboard cutter, wood etc.

In a typical hacksaw or keyhole saw the frame runs substantially parallel to the line of a narrow blade. Typically, the blade of such tools is replaced as the teeth of the blade become blunt through use, or the blade is broken. The keyhole saw is particularly useful for fretwork, hobby or craft work where precise cuts are required. The bigger version of such a tool is more bulky, but is typically used for a range of cutting procedures. The advantage of a hacksaw or keyhole saw is that the blade is replaceable when it becomes blunt or broken. This is an advantage over saws with fixed blades that, when blunted, requires sharpening, or if they get bent or structurally damaged, the saw typically has to be thrown away.

Hand tools in the past having a changeable blade were cumbersome in both releasing and securing the blades. For example, U.S. Pat. No. 2,890,732 [Westlund, Jr.] describes a saw with a saw blade holding body provided with a pistol grip. A clip on the handle can retain the lever in the flush holding position to maintain the blade locked to the handle, and a spring urges the retaining lever into the extended freeing position. A disadvantage of this system is that both releasing and securing a blade are two-step operations. To release the blade the clip must be opened and the lever flipped back; to secure the blade the lever must be swung forward and the clip closed. If the clip accidentally bumped or opened, the lever will swing out under spring force and the blade will separate from the handle. Another disadvantage is that the contact area between the retaining formation is limited so that it can loosen when worn, letting the blade move relative to the handle when locked in place.

Many of the prior handsaws used a screw or bolt to hold the blade in position. The action to release the blade was by loosening the bolt or screw. For example, U.S. Pat. No. 6,854,187 [Huan] discloses a keyless blade clamp that uses a clamping mechanism including a spring tensioned slidable block to hold a blade in place against a base plate with a round positioning protrusion mating with an aperture in the blade shank. A disadvantage to this type of clamping mechanism is that there is only a single force retaining the blade in position between the plate and spring block so that lateral forces may permit the blade to become disengaged from the clamp mechanism.

Another patent, U.S. Pat. No. 6,578,268 [Hawketts], discloses a handsaw with a retractable blade that is adjustable by a screw threaded lug or bolt, and a U-shaped cavity that holds the blade but does not grip it. A disadvantage to this device is that the blade is not capable of rotation to a different orientation; it only adjusts in length by loosening or tightening a bolt. Another disadvantage of this device is that it has a U-shaped cavity that will not hold the blade firmly in place.

Yet another patent, U.S. Pat. No. 4,248,284 [Tomosada], describes a hand saw with an interchangeable saw blade, the saw blade having a U-shaped reinforcing member, which uses a bolt to lock the blade into place. Another patent, U.S. Pat. No. 3,114,402 [Jacoff], describes a hand saw that has a rotatable blade-holding chuck, and the means for locking and unlocking the blade-holding chuck by means of a clamp and nut. Another patent, U.S. Pat. No. 2,778,395 [Forsberg], discloses a saw blade holding device which allows for a blade having an elongated slot, generally in the shape of a "T," to be placed in any of four different directions and held in place by a T-lug that fastens the blade to the handle or gripping portion of the saw. Another patent, U.S. Pat. No. 2,773,528 [Gringer], describes a saw and saw handle that holds the blade in place by a plate clamp secured in position by a bolt. The bolt may be loosened for turning the blade and clamping mechanism and then tightened again to hold the blade in place at the rotated position.

A common disadvantage of all of the above-described devices is that the blades cannot be retained securely in place because of the use of a bolt fastening means. The bolt will tend to loosen with use causing the blade to "wobble" against the cutting force, or to displace laterally from the cutting force. Another disadvantage to using a bolt and/or screw to tighten and release the blade is that such action is a time consuming task.

Therefore, a need exists for a hand saw that locks the blade into place without the use of screws or bolts and which permits a tightly clamped fit of the blade to the handle grip. A need also exists for a hand saw that has the ability to utilize blades whose teeth can be turned to face in different directions so that a user does not have to shift his/her arm or hand to saw. A further need exists for a hand saw that ensures additional stability of the saw blade by applying pressure to the bottom of the blade during sawing.

The present invention provides an ergonomic hand held saw with unique "T" shaped blades that fit into a similarly configured channel of a handle of the pistol grip type support. The present invention also provides the user with the ability to saw in different directions while employing the normal sawing motion. The present invention's "T" shape, coupled with its position within the elongated channel, provides sufficient support to help prevent blade wobble or bending. The present invention also provides an additional trigger-like clamping mechanism located on the pistol grip, which, when squeezed, rotates a rubber surfaced pad upward through a notch in the base of the blade channel, to ensure additional stability by applying pressure against the bottom of the blade.

SUMMARY OF THE INVENTION

The present invention is a hand saw with an ergonomically constructed pistol grip type support for use with a number of variations of cutting and filing blades having a T-shaped mounting shaft configuration. The support grip is designed and constructed with an elongated support having a blade channel configured for receiving and supporting a particularly shaped "T" blade. Each blade mounting shaft includes an aperture at its back end for receiving a locking pin also positioned at the back end of the blade holder, which pin engages the aperture to secure the blade in the support grip.

The "T" blades are inserted into the blade channel with the saw teeth in one of four directions and facing the desired cutting target. The "T" shape, coupled with its position within the blade channel, provides sufficient support to prevent blade wobble or bending. Additionally, a trigger mechanism on the pistol grip, when squeezed, rotates a rubber surfaced pad upward through a notch in the base of the support grip contacting the opposing, exposed side of the blade mounting shaft. This further ensures stability by applying pressure to the blade mounting shaft and forcing the shaft upward against the top of the blade channel of the handle. The "T" design of the blade permits utilizing blades whose teeth can be faced in different directions, varied by 90°, which insures that a user does not have to twist their body or arm to saw. Many standard tooth styles can be utilized, e.g., hacksaw, rasps of different configurations, wallboard cutter, wood saws having different tooth configurations, etc.

It is an object of the present invention to provide additional blade strength by making the blade structure a "T" shape. Another object of the present invention is to provide a hand saw that can employ a multitude of tooth styles, e.g., rasps of different configurations, wood saws having different tooth configurations, metal saws having different tooth configurations, double sided blades, etc. It is another object of the present invention to have a support grip design that permits a tight fitting blade insertion. It is yet another object of the present invention to utilize blades whose teeth can be faced in different directions so that the user does not have to shift his/her arm or hand to saw, while employing the normal sawing motion. Still further, an object of the present invention is to allow the user to saw in confined areas or "tight quarters" where large saws would not be practical or feasible.

These and other objects, features, and advantages of the invention will become apparent upon reference to the following more detailed description and claims taken in conjunction with the accompanying drawings.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 2 is another side view of the handsaw of the present invention showing the elongated blade support channel in phantom lines with the blade position locking mechanisms released and the "T" blade being removed from the blade channel.

FIG. 3B is a sectional view of the handsaw of the present invention taken along lines B-B of FIG. 3 showing the shape of the blade channel.

FIG. 5A is a side view of the handsaw of the present invention with the blade positioned inside the channel with the blade teeth facing downward and the blade position locking mechanisms in the locked positions.

FIG. 5B is a side view of the handsaw of the present invention with the blade positioned inside the blade channel with the blade teeth facing upward and the blade position locking mechanisms in the locked positions.

DETAILED DESCRIPTION OF THE PREFERRED EMBODIMENT

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
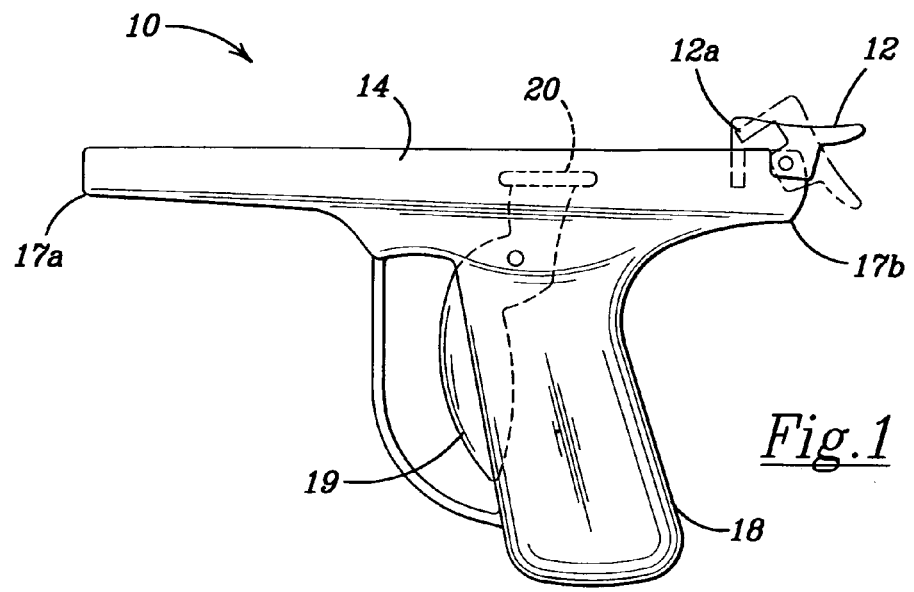
FIG. 1 is a side view of the handsaw of the present invention without a blade with the blade position locking mechanisms shown in phantom lines.

Referring now to the drawings in detail, where like numerals refer to like parts or elements, there is shown in FIG. 1 a handsaw 10 of the present invention, but without a blade, including a first blade position locking mechanism 12 (shown in part in phantom lines), a front end 17a, a back end 17b, a blade support 14, a locking pin 12a (part of the first blade position locking mechanism) positioned at the back end 17b of the support grip 14, a pistol grip 18, and a trigger-type blade position locking mechanism 19 having a rubber surfaced blade contact pad 20, shown in phantom in this view. The locking pin 12a is capable of being dropped into position when a blade 11 is inserted into an elongated blade channel 16 from the front end 17a to secure the blade 11 within the channel 16 of the support 14. The blade 11 includes a cooperating aperture 13 at one end that is engaged by the locking pin 12a when the blade is inserted into the blade channel 16, and is then locked into position and held in place securely within the support 14.

FIG. 2 shows another side view of the handsaw 10 of the present invention showing the elongated blade support channel 16 (in phantom lines) along the longitudinal direction of the handsaw 10 with the blade position locking mechanisms 12, 20 in the blade released positions. The "T" blade 11 shown being removed from the front end 17a of the blade channel 16. The blades 11 are specially designed with a "T" shank 11a [See FIGS. 4A-4D] to give more rigidity to the blade and to cooperatively mate with the structural configuration of the blade channel 16. The inserting of the blade 11 into the specially designed blade channel 16 may be accomplished with the saw teeth facing in any of four selectable directions chosen in accordance with the desired cutting target. Each of these directions are predetermined to be at 90° to each adjoining direction. The blade channel 16 is located within and extends along the top of the support 14. The channel 16 receives and supports the shank 11a of any of a variety of "T" blades 11 that are insertable into the channel 16 for use.

Figure 3:
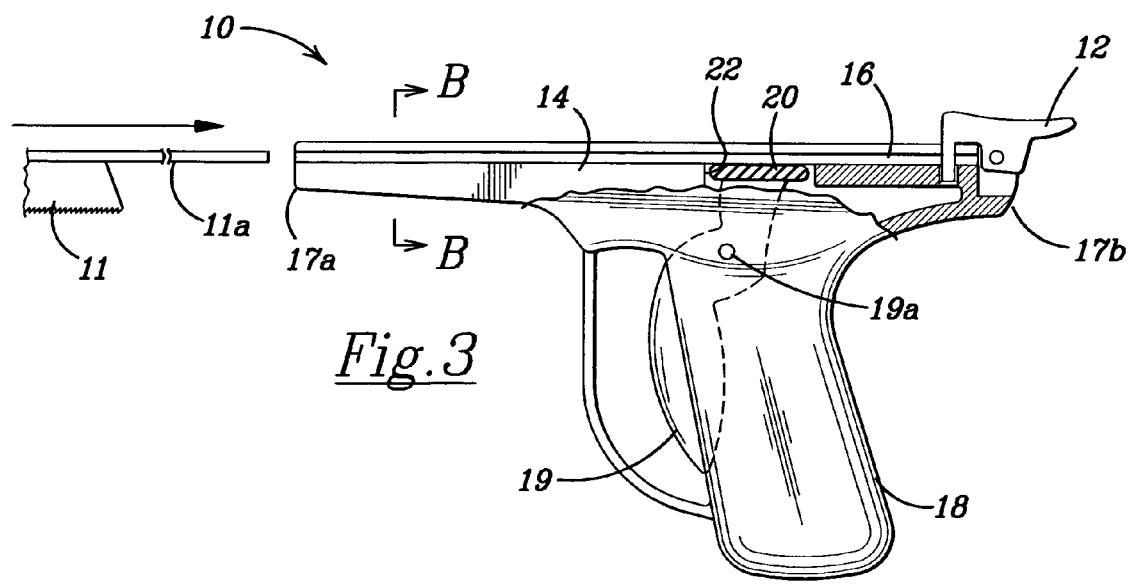
FIG. 3 is partial cutaway view of the handsaw of the present invention showing the "T" blade being inserted into the elongated blade support channel and the trigger grip locking mechanism pad engaging with the underside of the inserted "T" blade.

With reference to FIG. 3, there is shown a partial cutaway view of the handsaw 10 showing the "T" blade 11 being inserted into and engaging with the handsaw 10. The base of the support 14 along the bottom of the elongated channel 16 contains an opening 22 large enough to allow passage of the pad 20 of the blade engaging and locking mechanism to engage the bottom of the blade shank 11a. The trigger-like blade locking mechanism 19, located on the front side of the pistol grip 18, when squeezed inward causes the arm to which the pad 20 is attached to rotate about a pin 19a so that the rubber surface of the blade contact pad 20 moves upward through the opening 22 in the base of the support 14 to engage the blade shank 11a. This action ensures the stability of the blade within the hand grip 18 of the saw 10 by applying pressure to the downward facing portion of the blade shank 11a forcing it upward against the top of the channel 16. FIG. 3B shows a front sectional view of the handsaw 10 more clearly showing the "T" shape of the blade channel 16. The channel 16 is specially configured to provide for a reciprocal "T" shape in order to accommodate the "T" blade shank 11a that may be inserted into the support 14 in any of the predetermined four differently facing directions.

Figure 4A:
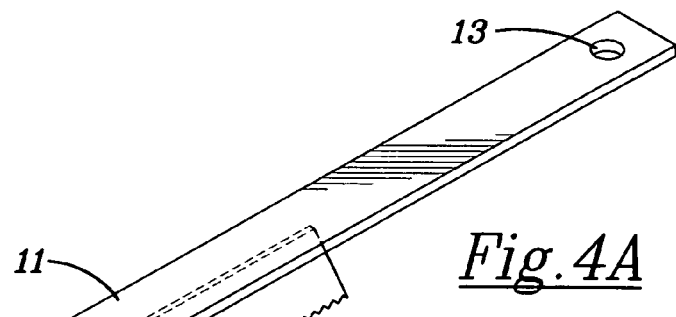
FIG. 4A is a perspective view of a "T" blade attachment of the present invention with a downward facing cutting blade.
Figure 4B:
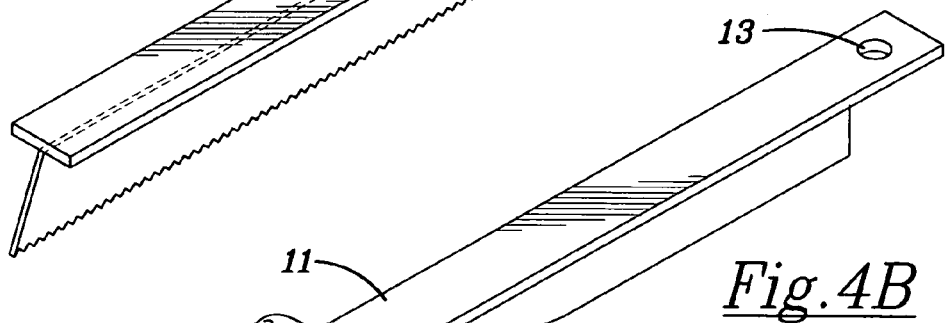
FIG. 4B is a perspective view of a "T" blade attachment of the present invention with a tapered rasp end.
Figure 4C:
FIG. 4C is a perspective view of a "T" blade attachment of the present invention with a cylindrical rasp end.
Figure 4D:
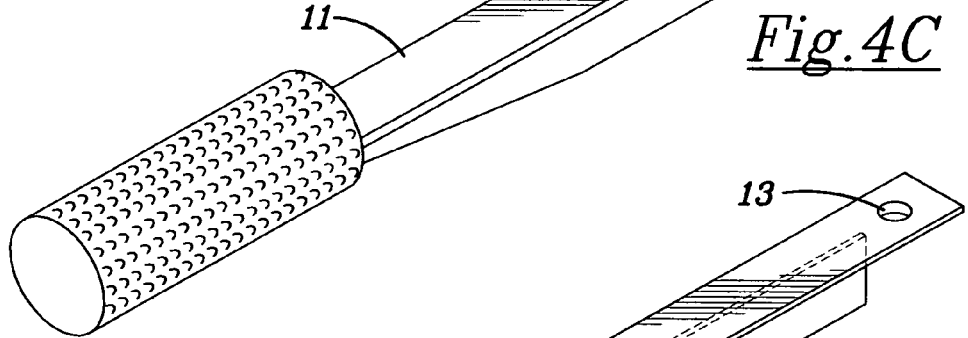
FIG. 4D is a perspective view of a "T" blade attachment of the present invention with a double-sided blade.

FIGS. 4A-4D show variously shaped "T" blade attachments 11 with each of the blades 11 having a blade locking aperture 13. The blade locking aperture 13 cooperatively engages with the locking pin 12a of the first or upper locking mechanism 12 located on the support 14 at the rear end 17b of the handsaw 10 for locking the blade 11 into place within the channel 16. a variety of standard teeth styles can be utilized and the blades 11 have the ability to be oriented in each of the four different directions to prevent the user from having to shift his body, arm, or hand in order to operate the saw 10. FIG. 4A shows a downward facing wood cross-cut blade 11 for use as a keyhole saw. FIG. 4B shows a "T" blade attachment with a tapered conical rasp end 11 for filing burrs from a round hole or curved surface. FIG. 4C shows a "T" blade attachment with a cylindrical rasp end 11, also for filing burrs from a round hole or for filing a rough spot from a curved surface. FIG. 4D shows a "T" blade attachment with a double-sided blade metal cutting blade 11, oriented transversely, for side cutting. Other blade structures and configurations are also contemplated by this invention; provided that the blade shank 11a is configured in the unique "T" shaped structure to be appropriately positioned and locked into the handsaw 10 by use of the locking aperture 13 and the upper locking mechanism 12.

FIGS. 5A and 5B show two alternate positions of blade direction for use with the handsaw 10 of the present invention. FIG. 5A shows a downward facing blade 11 positioned inside the channel 16 with the upper locking mechanism 12 in the locked position by engaging the locking aperture 13 on the blade shank 11a with the locking pin 12a. FIG. 5B shows an upward facing blade 11 positioned inside the blade channel 16 with the upper locking mechanism 12 engaged in the locked position as described above. With the reciprocal structural arrangement of the blade channel 16, as shown clearly in FIG. 3B, the blades 11 can also be placed in the channel 16 to cut in a lateral direction with the blade 11 facing either to the left or to the right of the pistol grip 18. In this manner, the blade 11 can be oriented in any of the four directions; down, up, left or right. In use the lower locking mechanism, the blade contact pad 20 is pushed upward against the bottom surface of the blade 11 to engage the blade 11, regardless of its orientation, pushing the blade 11 upward against the top surface of the T-channel 16. Thus, by applying pressure from the user's hand against the lower blade locking mechanism pad 19, the pad 20 is rotated into position through aperture 22 as the lower blade locking mechanism rotates about pin 19a. In this fashion the blade 11 is retained in a locked position to significantly reduce any loosening through use of any nut and bolt type retention mechanisms.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A T-back hand saw comprising a "T" shank blade, a blade support including an elongated T-shaped blade channel, an upper blade position locking mechanism and a cooperating locking pin, a pistol grip below the blade channel including a trigger-type lower blade position locking mechanism, said lower blade position locking mechanism including a blade contact pad for forcing the blade upward against the top surface of the T-shaped blade channel in reaction to the user squeezing the pistol grip.

2. The T-back hand saw of claim 1 wherein, the upper blade position locking mechanism further comprises a locking aperture at the proximal end of the blade to engage with the locking pin when the blade is inserted into the elongated blade channel to lock the blade within the channel.

3. The T-back hand saw of claim 1 wherein, the bottom of the elongated channel contains an opening large enough to allow passage of the blade contact pad of the lower blade position locking mechanism to engage the bottom of the "T" shank blade.

4. The T-back hand saw of claim 1 wherein, the lower blade position locking mechanism is a trigger-type being located within the pistol grip.

5. The T-back hand saw of claim 1, wherein upon squeezing the trigger-type blade position locking mechanism, the arm to which the contact pad is attached to rotates about the locking pin so that a rubber surface of the pad moves upwardly through the opening in the base of the support engaging the blade shank thereby, ensuring stability of the blade within the hand grip of the saw and applying pressure to the bottom of the blade shank forcing it upwardly against the top of the channel.

6. The T-back hand saw of claim 1 wherein, the blade channel has a reciprocal "T" shape to accommodate the "T" blade that is inserted into the blade support.

7. The T-back hand saw of claim 1 wherein, the blade can be any one of a plurality of different teeth styles and being interchangeable.

8. The T-back hand saw of claim 1 wherein, the blade is capable of being placed in a plurality of different directions to prevent the user from having to shift his body, arm, or hand in order to operate the saw.

* * * * *